United States Patent Office 3,370,356
Patented Feb. 27, 1968

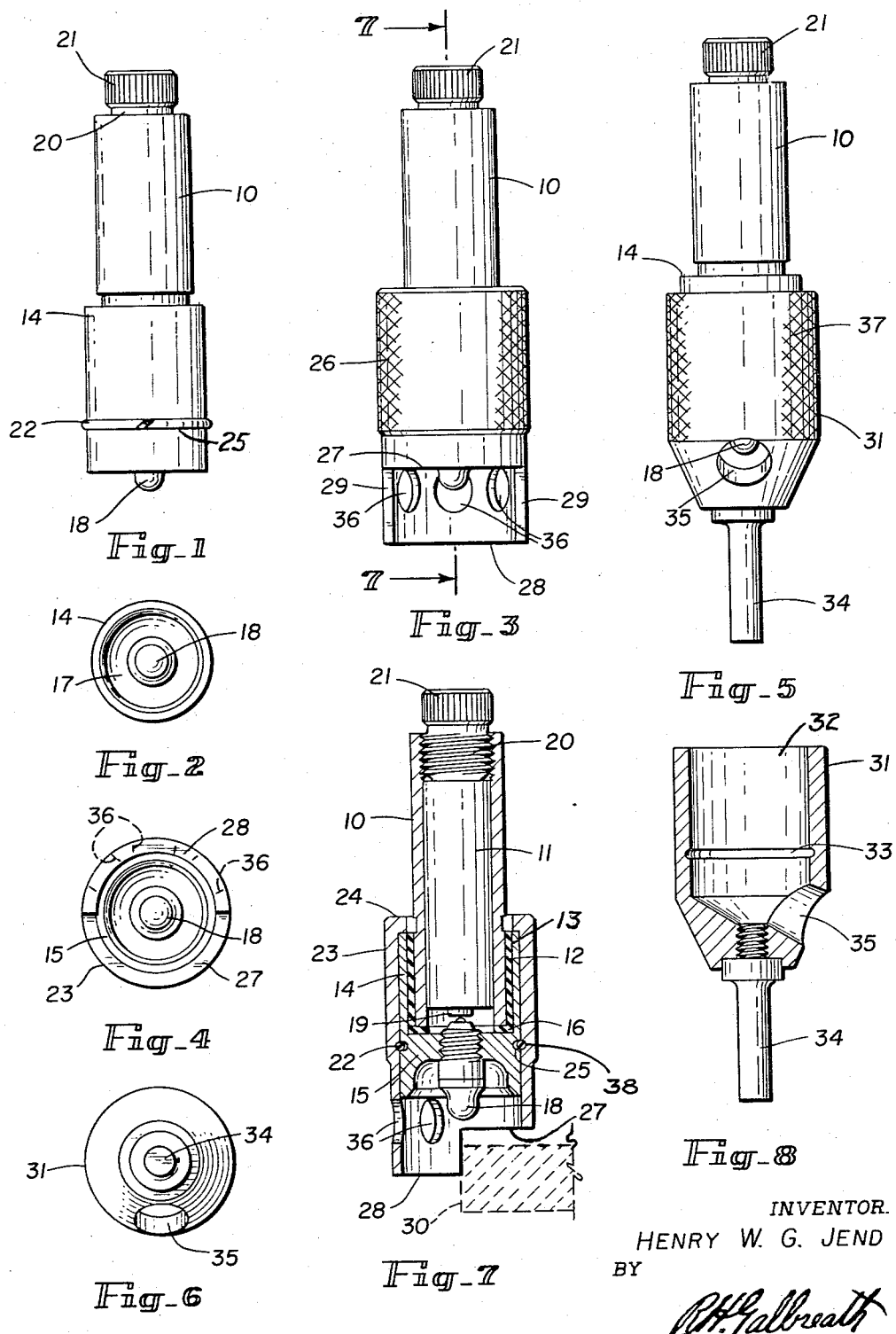

3,370,356
EDGE FINDING TOOL FOR MACHINISTS
Henry W. G. Jend, 2537 Chelton Road,
Colorado Spring, Colo. 80909
Filed Aug. 30, 1965, Ser. No. 483,729
1 Claim. (Cl. 33—169)

ABSTRACT OF THE DISCLOSURE

A tubular shank containing a battery, adapted to be gripped in a drill chuck, said shank having a body member, containing an electric lamp, rotatably mounted thereon and insulated therefrom so that when said body member electrically contacts a workpiece, a circuit will be closed to said shank to illuminate said lamp from said battery.

---

Working drawings such as furnished to machinists and similar mechanics give accurate measurements to locate the centers of drilled and milled holes or depressions so that a workpiece can be produced accurately corresponding to the drawings. Such measurements are usually given to indicate distances from the edge or edges of the workpiece.

Therefore, after the workpiece is set up on the table of a milling machine or drill press, it is necessary to accurately locate the position of the basic edge so that the required distances can be setoff from the edge by actuation of the machine controls to accurately reproduce the element shown on the drawings.

The principal object of this invention is to provide an edge locating tool which can be mounted in the chuck of a milling machine, drill press or other equipment and which, when the machine feed controls are operated to position a workpiece, will give a signal when the plane of a basic edge of the workpiece is exactly below the axis of the chuck so that the locating tool can then be replaced by a working tool, such as a drill, reamer or milling tool and the table feed controls actuated to accurately move the working tool the required distance from the located edge and into accurate working position.

Attempts have been made to provide edge finding tools consisting of an axially positioned probe which, when contacted by the edge of the workpiece, will give a signal. Such attempts have not been uniformly satisfactory since inaccuracies are introduced by the radius of and the flexing of the contacted probe.

A further object of this invention is to avoid the above objections by replacing the probe with means which will allow the plane of an edge of a workpiece to be brought exactly into the plane of the axis of an edge-finding tool without intervening physical contact at the point of intersection.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a side elevational view of the improved edge-finding tool;

FIG. 2 is a bottom view thereof;

FIG. 3 is a side elevation view thereof showing a hollow, edge-finding, sleeve attachment in place on the tool;

FIG. 4 is a bottom view of FIG. 3;

FIG. 5 is a side elevational view showing a probe attachment which may be applied to the tool;

FIG. 6 is a bottom view of FIG. 5;

FIG. 7 is a longitudinal section taken on the line 7—7, FIG. 3; and

FIG. 8 is a detail sectional view of the probe attachment of FIG. 5.

The basic tool assembly, as shown in FIG. 1, comprises a tubular, cylindrical, metal chuck shank 10, adapted to be gripped in a machine chuck, containing a battery 11, preferably a conventional cylindrical, 1½ volt dry cell. The lower extremity of the shank 10 is surrounded by a cylindrical insulating sleeve 12, of suitable electrical insulation, such as nylon, and the shank and its insulating sleeve are press-fitted into a cup-shaped socket 13 in the top of a cylindrical metallic body element 14 provided with an integrally-formed bottom 15.

The annular lower extremity of the tubular shank 10 is electrically insulated from the bottom 15 of the body element by means of a suitable insulating washer 16 which may be an integral part of the insulating sleeve 12. The lower extremity of the body element 14 is arcuately hollowed to form a reflector 17 for a lamp bulb 18. The lamp bulb 18 is threaded concentrically and upwardly through the bottom 15 so as to contact the positive pole 19 of the battery 11.

The negative pole of the battery is contacted by a metallic switch plug 20 which is threaded into the upper extremity of the shank 10 and provided with a knurled head 21 to facilitate rotation thereof. The body element 14 is preferably provided with a conventional, annular, resilient snap ring 22 which is inset in and expands from a suitable circumferential groove 25 adjacent the lower extremity of the body member 14.

The above described assembly comprises the basic tool element of this invention. It can be seen that, with the switch plug 20 threaded against the battery 11, a circuit can be closed to the bulb 18 by shorting the body element 14 to the shank 10. If the switch plug be threaded away from the battery the circuit will remain open regardless of such shorting.

Thus, if the shank 10 be gripped in the chuck of a drilling or milling machine and a workpiece, mounted on the table of the machine, be brought into contact with the body element 14, a circuit will be closed, through the milling machine, to illuminate the bulb 18 and indicate a contact has been made.

One means for making the latter contact comprises an edge-contacting sleeve 23 having an internal diameter to enable it to be slipped downwardly over the body element 14. The sleeve 23 is provided with an internal stop flange 24 at the top, to limit its downward movement, and with an internal ring groove 38 to be engaged by the snap ring 22 to retain the sleeve in its proper operating position. The sleeve 23 projects downwardly below the bulb 18 and is provided with a knurled external surface 26 by means of which it may be freely rotated on the body element 14.

One half of the lower arcuate edge of the lower extremity of the sleeve 23 is cut back to provide a horizontal, semi-annular upper surface 27 and a horizontal, semi-annular lower surface 28. The surfaces 27 and 28 are joined by vertical, edge-contacting, surfaces 29 positioned diametrically opposite each other and exactly in the axial plane of the sleeve 23.

With the shank in place in a machine chuck and with the sleeve 23 in place thereon, a machine operator can adjust the machine table to cause the edge of a workpiece, such as indicated in broken line at 30 in FIG. 7, to approach the vertical edge-contacting surfaces 29. Should the first contact be made with only one of the vertical surfaces 29, the bulb 18 will illuminate. Careful, further approach will then cause the sleeve 23 to automatically rotate until both of the vertical surfaces 29 contact the edge of the workpiece and lie exactly in the vertical plane of the workpiece edge. The operator then knows the axis of the finding tool is positioned exactly in the plane of the edge and he can replace the finding tool with any desired tool and proceed with the work by actuating the calibrated feed controls of the machine.

There may be instances where the rotating edge finding sleeve 23 cannot be satisfactorily used. For these uses, the sleeve can be quickly removed by pulling it upwardly on the body element 14 and replaced by a probe sleeve 31, as illustrated in FIGS. 5 and 8.

The probe sleeve is formed with a cup-shaped socket 32 which can be slipped upwardly over the body element 14. The socket is provided with a ring groove 33 which will be engaged by the snap ring 22 to hold the sleeve in place on the body element 14. A metal probe 34 is threaded axially upward into the bottom of the socket which, when in contact with the workpiece 30, will illuminate the bulb 18 to give a contact signal.

The probe sleeve 31 is provided with a light-emitting window 35 and the edge-contacting sleeve 23 is provided with similar window openings 36 to facilitate viewing the signal light rays. The probe sleeve 31 is preferably knurled, as indicated at 37, to provide a better hand grip.

The socket in the probe sleeve 31, the interior diameter of the edge-contacting sleeve 23 and the external diameter of the body element 14 are accurately finished so when the sleeves are in place no relative, lateral movement will be permitted between the body element and the sleeves.

While a specific form of the invention has been described and illustrated herein, it is to be understood that the same may be varied without departing from the spirit of the invention.

Having thus described the invention what is claimed and desired to be secured by Letters Patent is:

1. A tool for use in the tool chuck of a metal-working machine for locating an edge on a workpiece positioned in, and electrically grounded to, said machine below said chuck comprising: an elongated, tubular, metallic shank adapted to be gripped by and electrically grounded to said chuck; a body member mounted on and electrically insulated from the lower extremity of said shank; a battery positioned in, and in electrical circuit with, said shank; an electrically-operated signal device carried by, and in electrical circuit with, said body member; and a rotatable metallic sleeve concentrically fitted over, and electrically connected to, said body member and extending therebelow to contact the workpiece and close an electrical circuit through said machine and through said chuck to said shank, said sleeve being provided with two vertical surfaces extending downwardly from its lower annular extremity, said vertical surfaces being positioned diametrically opposite the axis of said sleeve so that when both surfaces are simultaneously in contact with an edge of said workpiece the axis of said tool will be positioned in alignment with the plane of said edge, and a lower, horizontal, semi-annular, concentric surface, and a horizontal, upper, semi-annular, concentric surface, said vertical surfaces joining the extremities of the lower surface to the extremities of the upper surface.

References Cited

UNITED STATES PATENTS

| 2,109,976 | 3/1938 | Pierce | 33—172 |
| 2,533,198 | 12/1950 | Radtke | 33—169 |

FOREIGN PATENTS 1,035,033 4/1953 France.

LEONARD FORMAN, *Primary Examiner.*

R. A. FIELDS, *Assistant Examiner.*